Dec. 16, 1930.   N. A. STRAND   1,785,055

DRIVING MECHANISM

Filed Oct. 15, 1928

Inventor
Nels A. Strand
By Fred Gerlach
Atty.

Patented Dec. 16, 1930

1,785,055

UNITED STATES PATENT OFFICE

NELS A. STRAND, OF EVANSTON, ILLINOIS

DRIVING MECHANISM

Application filed October 15, 1928. Serial No. 312,523.

The invention relates generally to driving mechanism and more particularly to that mechanism which is in the form of an attachment for an electric motor and embodies a countershaft and a pulley-and-belt connection between the rotor shaft of the motor and said countershaft whereby the latter is driven at a higher speed than the former, and in which the frame for supporting the countershaft and the driven pulley is adjustably mounted above the motor so that the belt may be rendered taut and removed or shifted with respect to the driving pulley on the rotor shaft, and the countershaft is connected to drive a flexible shaft which in turn drives at high speed a grinder wheel or drill.

Heretofore, in this type of driving mechanism, it has been the practice to employ but one countershaft and to support this shaft by a fork which constitutes the essential or primary part of the pulley-frame and consists of a pair of longitudinally spaced depending fork-forming members which straddle the driven pulley and have their lower ends shaped to form bearings for the ends of the countershaft. With an arrangement of this character it is manifest that the speed ratio of the countershaft and rotor shaft cannot be exceedingly large and that the belt can only be removed from the driven pulley by first sliding the countershaft axially out of engagement with the bearings in the fork and then moving the driven pulley so that it is free from the fork-forming members.

One object of the present invention is to provide a driving mechanism of the type under consideration, which is of a unitary character and permits the countershaft to be driven at a comparatively high speed or speed ratio by the employment of an intermediate countershaft which is driven from the rotor shaft of the motor by a belt-and-pulley connection and is connected to drive the countershaft for the flexible shaft by a second belt-and-pulley connection.

Another object of the invention is the provision of a pulley-frame which permits the belt between the two countershafts as well as the belt between the intermediate countershaft and the rotor shaft to be disconnected for repair or displacement purposes without the necessity of disturbing either of the countershafts or the parts associated therewith.

A further object of the invention is to provide a driving mechanism which is of new and improved construction and in which facility of adjustment and variability of action of the various parts are combined with durability and compactness of construction.

Other objects will be apparent from a consideration of the following detailed description.

The invention consists in the several novel features hereinafter set forth and more particularly defined by the claims at the conclusion hereof.

In the drawing which accompanies and forms a part of this specification or disclosure and in which like numerals of reference denote corresponding parts throughout the several views.

Figure 1:
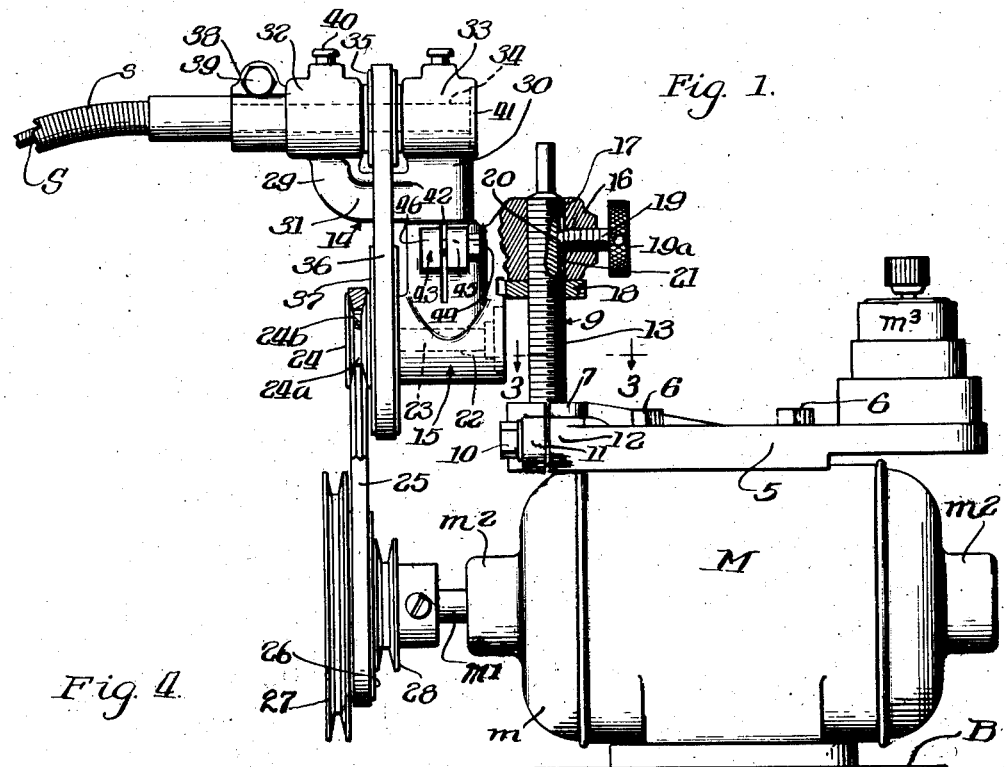
Figure 1 is a side elevational view of an electric motor provided with a driving mechanism embodying the invention, a portion of said mechanism being shown in section for purposes of illustration.
Figures 2, 4:
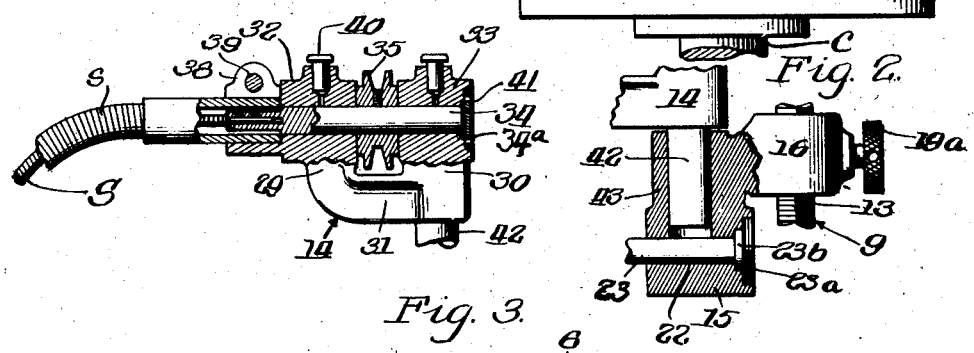
Figure 2 is a detail sectional view illustrating the connection which permits the pulley on the countershaft for the flexible shaft to be adjusted relatively to the pulley on the intermediate countershaft for the purposes of rendering the belt taut or permitting the latter to be removed or disconnected from the pulley-frame.
Figure 4 is a longitudinal section of that portion of the pulley-frame which supports the countershaft for the flexible shaft.
Figure 3:
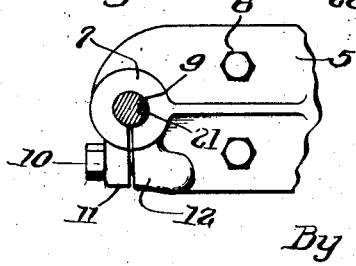
Figure 3 is a section taken on the line 3—3 of Figure 1, showing the manner in which the adjusting stud for the pulley-frame is fixedly secured to the motor bracket.

The invention is exemplified in a driving mechanism which is adapted to be associated with an electric motor M and forms the instrumentality whereby power from said motor is transmitted to rotate a flexible shaft S. The distal end of the latter (not shown in the drawing) is provided with a tool holder into which may be fitted a grinder wheel, a drill or any other similar tool, as well understood in the art. The motor M may be of any suitable or standard construction that is commonly used in connection with apparatus of this character, and is shown as comprising a substantially cylindrical casing $m$ and a rotor shaft $m'$ which extends through the casing and is journaled in bearings $m^2$. The motor M may be mounted or supported in any suitable manner, such, for example, as by a suspension cable or upon a bench B at the top of a swivel column C.

The driving mechanism which forms the subject matter of the present invention is in the nature of an attachment for the electric motor M and comprises an elongated bracket 5 which is adapted to be secured rigidly to the top of the motor casing $m$ by a plurality of machine screws 6 or other like securing devices. The rear end of the bracket 5 forms a rest upon which is secured an electrical control switch $m^3$ for the motor. A split collar 7 is formed integrally with the front end of said bracket 5 and has positioned therein the lower end of a vertically extending adjusting stud 9. A screw 10 is operative to clamp the collar 7 around the adjusting stud so as to secure the latter fixedly in place with respect to the motor-bracket. This screw extends through a pair of lugs 11 and 12 which are formed integrally with the end portions of the column 7. The outer periphery of the adjusting stud 9 is provided with a screw thread 13.

The improved driving mechanism also comprises a pulley-frame which is preferably formed of bronze and consists of an upper member 14 and a lower member 15. The lower member is provided at its upper end with a rearwardly extending lug 16. This lug has formed therein a vertically extending cylindrical socket 17 through which extends the adjusting stud 9. The socket 17 is slightly larger in diameter than the adjusting stud so that the lug 16 may be slid up and down relatively to said stud to adjust the pulley-frame vertically for purposes appearing hereafter. The lug 16 rests upon a nut 18 which is connected to the screw thread 13 and is rotatable around the stud 9 so as to effect the desired vertical shift of the pulley-frame. To prevent the frame from rotating about the adjusting stud 9 during manipulation of the nut 18, a screw 19 is provided. This screw extends horizontally and into the rear end of the lug 16 and is provided at its inner end with a point or projection 20 which fits in a vertical groove 21 in the rear part of the stud 9. The screw 19 is in the nature of a set screw and has a knurled head 19$^a$ at the rear end. When it is desired to elevate or lower the pulley-frame, the screw 20 is withdrawn sufficiently to avoid impingement of the point 20 against the stud 9. The nut 18 is then rotated to effect the desired vertical adjustment, during which operation the point 20 slides in the groove 21 and prevents relative rotation of the stud and pulley-frame. The lower member 15 of the pulley-frame is provided with a horizontally extending cylindrical hole 22 in which is journaled an intermediate countershaft 23. The front end of the latter is provided with a pulley 24 which comprises a hub 24$^a$ and is fixedly secured to the countershaft by a set screw 24$^b$ which passes through said hub. The pulley 24 is drivably connected by a belt 25 to a pulley 26 which is fixedly secured to the front end of the rotor shaft $m'$. Pulleys 27 and 28 are formed integrally with the sides of the pulley 26 and are respectively of a larger and smaller diameter than said pulley 26 so that the belt may be shifted from one to another when it is desired to change the speed of the intermediate countershaft. The latter is held against axial movement in its bearing by a cap or head 23$^a$ which is connected to the rear end of the frame-member 15 by a screw thread connection and bears against a shoulder 23$^b$ on said countershaft. The pulley 24 is smaller in diameter than the pulleys 26, 27 and 28 so that the countershaft will be driven at a higher speed than the rotor shaft $m'$.

The upper member 14 of the pulley-frame is in the form of an upwardly extending fork and comprises a pair of vertical and longitudinally spaced fork-forming members 29 and 30 which are connected together at their lower ends by an integral connecting member 31. The upper ends of these fork-forming members are enlarged and drilled to form a pair of coaxial bearings 32 and 33. A countershaft 34 is journaled in these bearings and has fixedly secured to the central portion thereof a pulley 35. This pulley extends between the bearings 32 and 33 of the fork-forming members and is connected to be driven from the intermediate countershaft by a belt 36 which has its lower end looped around a pulley 37. The latter is formed integrally with the pulley 24 and is contiguous to the front end of the lower member 15. The pulley 37 is larger in diameter than the pulleys 24 and 35 so that the countershaft 34 is driven at a higher speed than the intermediate countershaft. The front end of the bearing 32 is provided with an integral forwardly projecting split collar 38 having a screw 39 whereby it is clamped around the shell or outer covering $s$ for the flexible shaft S. An oil cup 40 is secured to the upper end of each bearing and is connected to deliver lubricant to the countershaft 34. The latter is held against axial displacement by a head 41 which is connected to the rear end of the bearing 33 by a screw thread connection and abuts against a shoulder 34$^a$ in said countershaft. The front end of the countershaft 34 is hollow and is connected to the flexible shaft S by a key or any other suitable means.

The portion of the connecting member 31 which underlies the bearing 33 is provided with a depending spindle 42. This spindle is integral with the upper frame member 14 and fits within a split collar 43 which is formed integrally with and projects upwardly from the frame member 15. A screw 44 extends through ears or lugs 45 and 46 on the collar and is operative to clamp the collar around the spindle. Said spindle and collar exemplify means whereby the upper member may be adjusted vertically with respect to the lower member so that the belt 36 may be rendered taut or removed. A characteristic of utilizing two countershafts is that the flexible shaft may be driven at a materially higher speed than the rotor shaft of the motor M. By forming the upper member of the frame so that it extends upwardly, the belt 36 may be removed readily for repair or replacement purposes without displacing or disturbing either of the countershafts, since it is only necessary to shift the frame-members 14 and 15 together, in which position the belt may be shifted forward out of engagement with the pulleys 35 and 37.

The operation of the driving mechanism is as follows: When the motor M is actuated by proper manipulation of the switch $m^3$, the pulley 26 is rotated and in turn drives the countershaft 23 through the instrumentality of the belt 25 and the pulley 24. The drive movement of the countershaft 23 is transmitted to the countershaft 34 by the belt 36 and the pulleys 35 and 37. In the event that the belt 25 becomes worn and it is necessary to make the same taut the pulley-frame is raised by adjusting the nut 18, as previously described. Should it be desired to remove the belt 25 for replacement purposes the nut 18 will be rotated in the opposite direction so as to lower the pulley-frame and permit the belt to be disconnected from the pulleys 24 and 26. The belt 36 is rendered taut by adjusting the spindle and collar connection between the upper member 14 and the lower member 15 of the pulley-frame.

The driving mechanism herein disclosed is of a unitary character and is compact. It consists of but a small number of parts and may be manufactured at a low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In driving mechanism of the character described, the combination of a bracket provided with means whereby it may be attached to the top part of the casing of an electric motor, a stud secured to one end of the bracket and extending upwardly therefrom, a frame adjustably mounted on the stud and provided with a pair of countershafts arranged one above the other, a belt and pulley connection between the rotor shaft of the electric motor and the lower countershaft, and a belt and pulley connection between the two countershafts.

2. In driving mechanism of the character described, the combination of a bracket adapted to be associated with an electric motor and provided with attaching means, a stud secured to the bracket and projecting upwardly therefrom, a frame adjustably mounted on the stud, a countershaft journaled in the lower portion of said frame and provided with a pair of pulleys, a countershaft journaled in the upper portion of the frame and provided with a pulley, a belt between the rotor shaft of the electric motor and one of the pulleys on the first mentioned countershaft, and a belt between the other pulley and the pulley on the last mentioned countershaft.

3. In driving mechanism of the character described, the combination of a bracket adapted to be associated with an electric motor and provided with attaching means, a stud secured to the bracket and projecting upwardly therefrom, a frame adjustably mounted on the stud and comprising upper and lower members and adjustable connecting means therebetween, a countershaft journaled in the lower member of said frame and provided with a pair of pulleys, a countershaft journaled in the upper member and provided with a pulley frame, a belt between the rotor shaft of the electric motor and one of the pulleys on the countershaft associated with said lower member, and a belt between the other pulley and the pulley on the countershaft associated with the upper frame-member.

4. In driving mechanism of the character described, the combination of a bracket adapted to be associated with an electric motor and provided with attaching means, a stud secured to the bracket and projecting upwardly therefrom, a frame adjustably mounted on the stud and comprising upper and lower members and adjustable connecting means therebetween, said upper member being shaped to form an upwardly extending fork, a countershaft journaled in the lower member of the frame and provided with a pair of pulleys, a countershaft journaled in the upper ends of the fork-forming members of the upper frame-member and provided with a pulley, a belt between the rotor shaft of the electric motor and one of the pulleys on the countershaft in the lower member, and a belt between the other pulley and the pulley on the countershaft in the fork.

5. In driving mechanism of the character described, the combination of a bracket adapted to be associated with an electric motor and provided with attaching means, a stud secured to the bracket and projecting upwardly therefrom, a frame comprising an upper member and a lower member, the lower member being provided at the upper end thereof with a split collar and a lug adjustably mounted on the stud, the upper member being shaped to form an upwardly extending fork and having a depending spindle fitting within the collar, a countershaft journaled in the lower member of the frame and provided with a pair of pulleys, a countershaft journaled in the upper ends of the fork-forming members and provided with a pulley, a belt between the rotor shaft of the electric motor and one of the pulleys of the countershaft in the lower member, and a belt between the other pulley and the pulley on the countershaft in the fork.

Signed at Chicago, Illinois, this 11th day of October, 1928.

NELS A. STRAND.